(12) United States Patent
Barber et al.

(10) Patent No.: US 6,435,297 B1
(45) Date of Patent: Aug. 20, 2002

(54) VEHICLE COMPONENT MOUNTING ASSEMBLY

(75) Inventors: Mark W. Barber, St. Thomas; Giovanni Di Cesare, London, both of (CA)

(73) Assignee: Cosma International Inc., Concord (CA)

( * ) Notice: Subject to any disclaimer, the term of this patent is extended or adjusted under 35 U.S.C. 154(b) by 0 days.

(21) Appl. No.: 09/722,349

(22) Filed: Nov. 28, 2000

Related U.S. Application Data
(60) Provisional application No. 60/167,844, filed on Nov. 29, 1999.

(51) Int. Cl.[7] .................................................. B60K 5/12
(52) U.S. Cl. ....................................... 180/291; 180/300
(58) Field of Search ................................. 180/291, 300, 180/312, 299; 403/279, 278, 274

(56) References Cited

U.S. PATENT DOCUMENTS

| | | | |
|---|---|---|---|
| 1,728,873 A | | 9/1929 | Masury |
| 1,728,875 A | | 9/1929 | Masury |
| 2,090,461 A | | 8/1937 | Sherman |
| 3,702,178 A | * | 11/1972 | Schulz ........................ 180/300 |
| 3,866,939 A | | 2/1975 | Fanslow |
| 4,288,107 A | | 9/1981 | Schwartze |
| 4,537,381 A | * | 8/1985 | Arai ........................... 248/559 |
| 4,588,459 A | | 5/1986 | Zwilling |
| 4,685,531 A | * | 8/1987 | Kopich ........................ 180/300 |
| 4,809,799 A | * | 3/1989 | Ozaki et al. .................. 108/292 |
| 5,035,397 A | * | 7/1991 | Yamada ...................... 248/638 |
| 5,062,496 A | * | 11/1991 | Fukada et al. ............... 180/291 |
| 5,074,374 A | * | 12/1991 | Ohtake et al. ............... 180/312 |
| 5,372,388 A | | 12/1994 | Gargiulo |
| 5,409,283 A | * | 4/1995 | Ban ........................... 296/35.1 |
| 5,622,392 A | | 4/1997 | Gochenouer |
| 5,718,407 A | * | 2/1998 | Lee ............................ 248/634 |
| 5,882,039 A | | 3/1999 | Beckman et al. |
| 5,967,251 A | * | 10/1999 | Turl et al. ................... 180/297 |

FOREIGN PATENT DOCUMENTS

| | | |
|---|---|---|
| DE | 196 12 885 A | 5/1985 |
| WO | WO 98/08724 | 3/1998 |
| WO | WO 99/25599 | 5/1999 |

\* cited by examiner

*Primary Examiner*—Lanna Mai
*Assistant Examiner*—Jeffrey J Restifo
(74) *Attorney, Agent, or Firm*—Pillsbury Winthrop LLP

(57) ABSTRACT

A device for mounting a vehicle component to a vehicle frame member. The device including a mounting spacer assembly having outer and inner mounting spacer structures and a plurality of parallel elongated fasteners. The outer mounting spacer extending through an opening in the vehicle frame member and the central exterior peripheral portion being welded to the frame member. The inner mounting spacer structure being secured within the outer mounting spacer structure in a rattle-free condition. The plurality of parallel elongated fasteners each having a shank configured at one end to engage the vehicle component and having a head at the opposite end. The mounting spacer assembly further including a plurality of longitudinally extending structural portions disposed in generally surrounding relation with each of the fastener shanks and in force transmitting relation between the vehicle component and each of the heads.

13 Claims, 6 Drawing Sheets

VEHICLE COMPONENT MOUNTING ASSEMBLY

This application claims priority from Provisional application Ser. No. 60/167,844, filed Nov. 29, 1999.

FIELD OF THE INVENTION

This invention relates to vehicle component mounting assemblies and more particularly to vehicle component mounting assemblies of the type embodying mounting spacer assemblies.

BACKGROUND OF THE INVENTION

Motor vehicle engines are typically mounted by mounting assemblies on an engine cradle assembly, which forms a part of the vehicle frame. At least one of the engine mounting assemblies usually includes a torque isolator component disposed between the engine and a frame member of the cradle assembly which serves to isolate engine torque and vibration from the cradle assembly during the vehicle operation.

To accomplish the mounting of the torque isolator component to the frame member, it is conventional to use mounting spacer assemblies, which are simply a cluster of cylindrical sleeves that extend through the frame member and receive fasteners (e.g., bolts) therethrough, which are used to secure the torque isolator component to the sleeves. The sleeves are passed through holes that are cut into the frame member and then welded to the edges surrounding the holes.

In typical applications, a cluster of three sleeves is provided in a relatively small area to accommodate the three bolts which, in turn, the torque isolator component accommodates. In this situation, it becomes difficult to weld the sleeves, as the spacing between the sleeves becomes small and access to the areas between the sleeves is difficult. The provision of a plurality of individual sleeves also gives rise to the necessity of a plurality of hole cutting operations. In addition, a sleeve cluster adds weight.

There are other instances of similar mounting assemblies being used with vehicle components, other than torque isolators such as, for example, steering components. There always exists a need in the automotive parts art to make a vehicle component mounting assembly, which is lighter and more cost effective.

BRIEF DESCRIPTION OF PRESENT INVENTION

It is an object of the present invention to fulfill the need expressed above. In accordance with the principles of the present invention, this objective is accomplished by providing a vehicle component mounting assembly, which comprises a vehicle frame member, a vehicle component constructed and arranged to be mounted in supported relation on the vehicle frame member, and a mounting spacer assembly which includes an outer mounting spacer structure in a rattle free condition. The vehicle component mounting assembly also includes a plurality of parallel elongated fasteners each having a shank configured at one end to engage the vehicle component and having a head at the opposite end. The outer and inner mounting spacer structures include a plurality of longitudinally extending structural portions disposed (1) in generally surrounding relation with each of the fastener shanks, and (2) in force transmitting relation between the vehicle component and the fastener heads. In a preferred embodiment the vehicle component of the vehicle component mounting assembly is a torque isolator constructed and arranged to be connected in torque and vibration isolating relation to a vehicle engine.

Another object of the present invention is to provide a mounting spacer assembly, which comprises an outer mounting spacer structure and an inner mounting spacer structure. The outer mounting spacer structure is in the form of an outer sheet metal member including a plurality of arcuate longitudinal extending force transmitting portions integrally interconnected in annularly spaced relation by a plurality of straight longitudinal extending connecting portions. The inner mounting spacer structure is in the form of an inner sheet metal member including a plurality of arcuate longitudinal extending force transmitting portions integrally interconnected in annularly spaced relation by a plurality of straight longitudinal extending connecting portions. The connecting portions of the outer and inner sheet metal members are interengaged to secure the inner sheet metal member within the outer sheet metal member in a rattle free condition. The force transmitting arcuate portions of the outer and inner sheet metal members cooperate together to generally surround a plurality of annularly spaced fasteners when extended between the end surfaces of the outer and inner members.

Another object of the present invention is to provide a method of making a mounting spacer assembly of the type previously described. The method comprises stamping a first sheet metal blank to provide an outer sheet metal member, which has a plurality of arcuate longitudinal extending force transmitting portions integrally interconnected in annularly spaced relation by a plurality of straight longitudinal extending connecting portions, two of the portions constitute free end portions disposed in an openly spaced relationship; stamping a second sheet metal blank to provide an inner sheet metal member which has a plurality of arcuate longitudinal extending force transmitting portions integrally interconnected in annularly spaced relation by a plurality of straight longitudinal extending connecting portions; positioning the inner sheet metal member within the outer sheet metal member when the end portions are in the openly spaced relation; and stamping the sheet metal members including the end portions toward one another into an operative secured position in a rattle free condition wherein the arcuate force transmitting portions cooperate together to form a plurality of longitudinally extending structural portions configured to substantially surround a plurality of parallel fastener shanks when extended between the ends of the outer and inner members.

DETAILED DESCRIPTION OF THE PREFERRED EMBODIMENTS OF THE INVENTION

Figure 1:
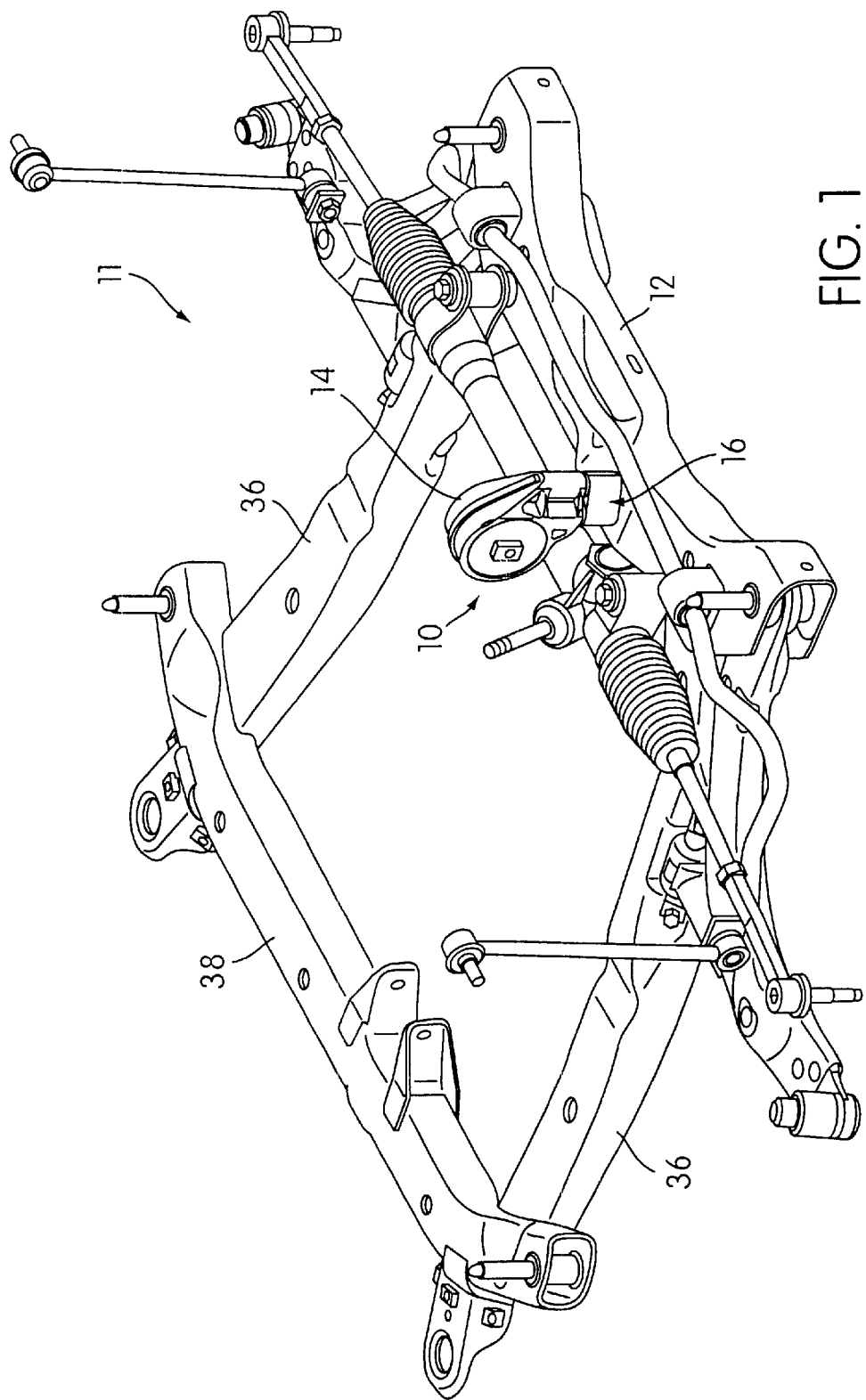
FIG. 1 is a perspective view looking down from the top of one side of a vehicle engine cradle assembly which includes a vehicle component mounting assembly embodying the principles of the present invention.

Referring now, more particularly to the drawings, there is shown in FIG. 1 thereof a vehicle component mounting assembly generally indicated at 10, embodying the principles of the present invention. As shown in FIG. 1, the vehicle component mounting assembly 10 is included with a vehicle engine cradle assembly, generally indicated at 11, which includes a vehicle frame member 12. The vehicle component mounting assembly 10, in addition to the vehicle frame member 12, includes a vehicle component, in the form of an engine torque isolator, generally indicated at 14, constructed and arranged to be mounted in supported relation on the vehicle frame member 12, and a mounting spacer assembly, generally indicated at 16, for effecting the mount.

Figure 3:
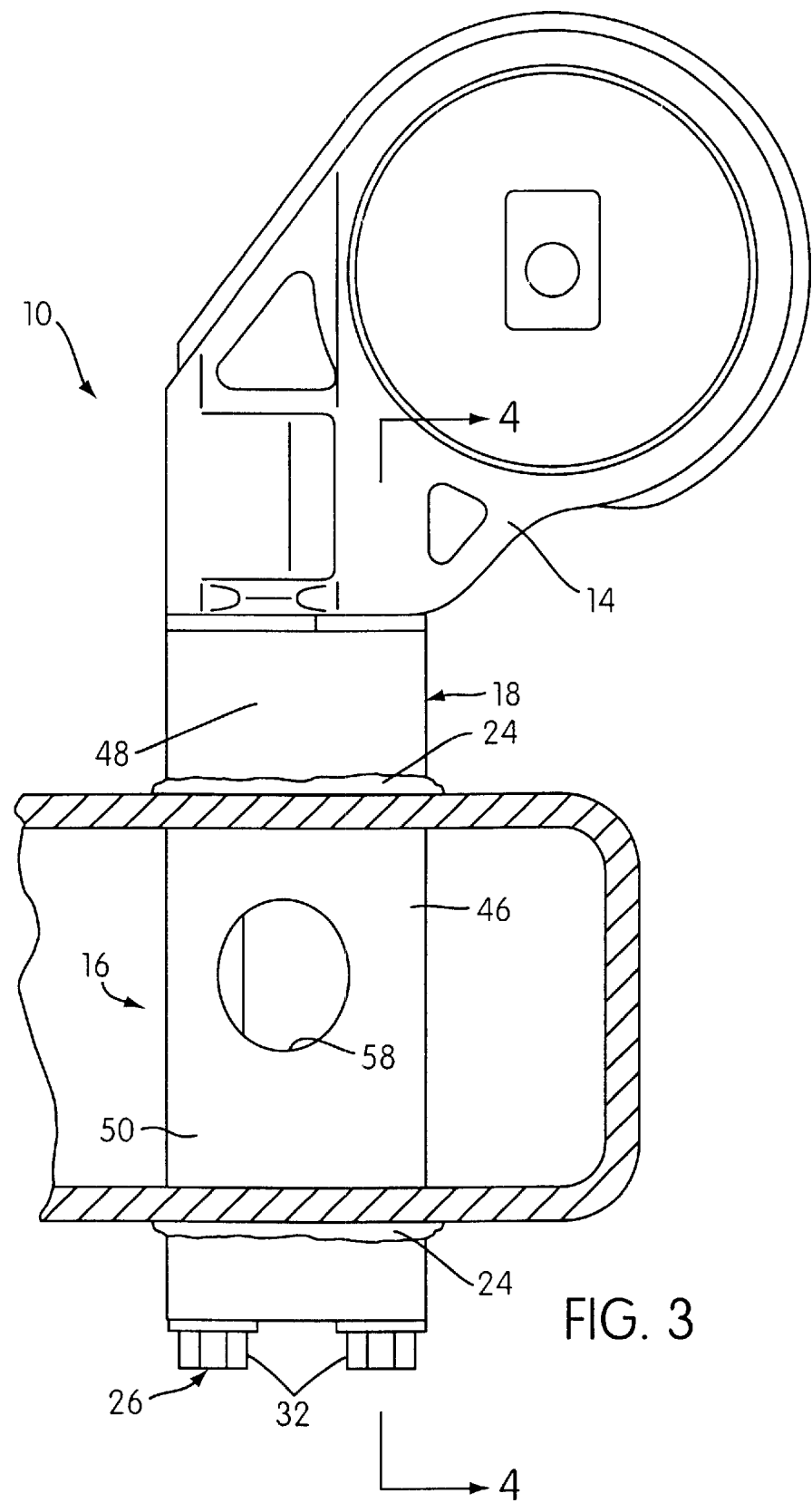
FIG. 3 is a side view looking from one side of the mounting spacer assembly showing the mounting spacer assembly in operative bolt secured relation with the component shown in FIG. 2.
Figure 4:
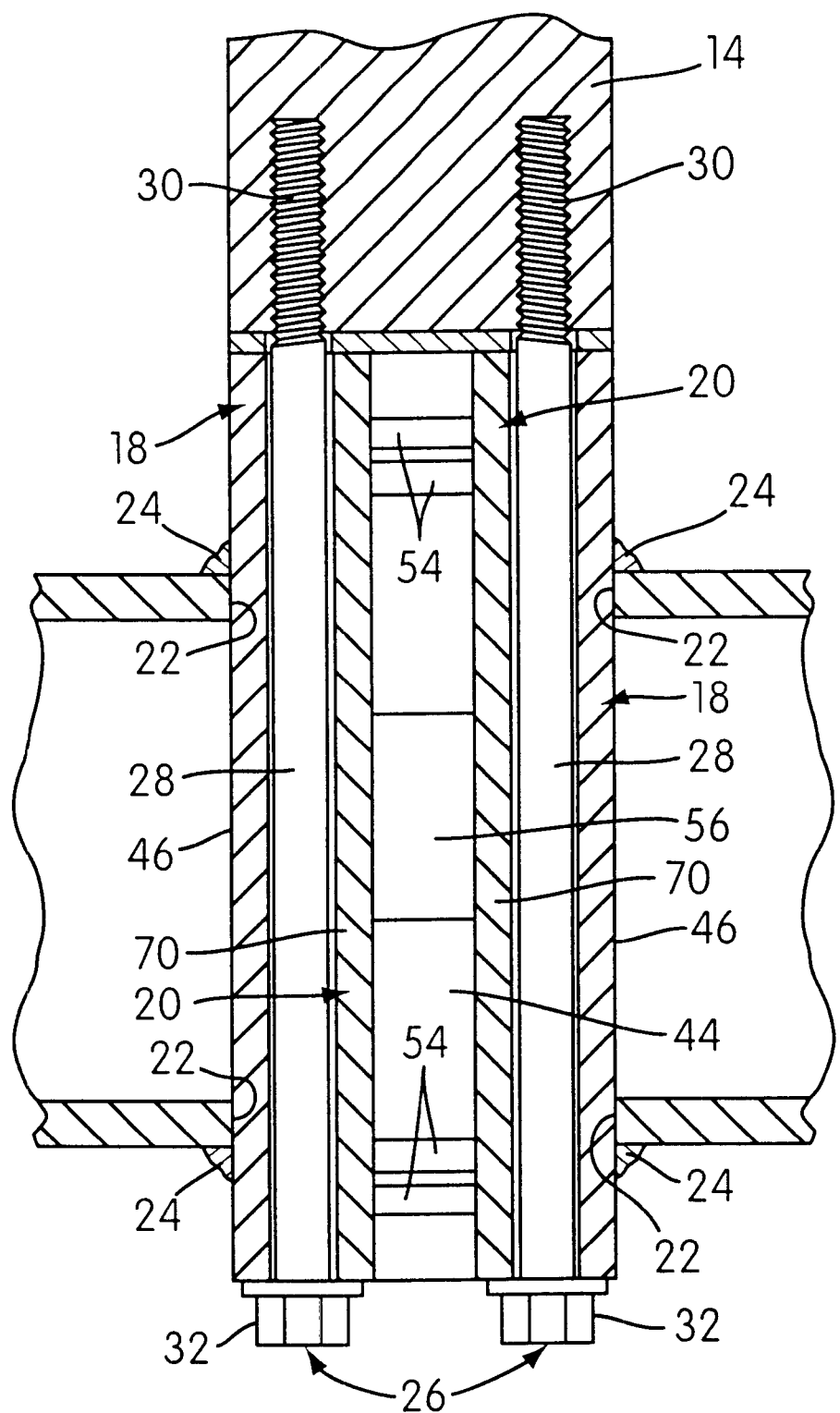
FIG. 4 is an enlarged sectional view taken along the line 4—4 of FIG. 3 showing the mounting spacer assembly in operative bolt secured relation with the component.

The mounting spacer assembly 16 includes: (1) an outer mounting spacer structure, generally indicated at 18, and (2) an inner mounting spacer structure, generally indicated at 20. As best shown in FIGS. 3 and 4, the mounting spacer assembly 16 extends through openings 22 in the vehicle frame member 12. The exterior periphery of the outer mounting spacer structure 18 is welded, as indicated at 24, to the exterior of each wall portion of the vehicle frame member 12. The inner mounting spacer structure 20 is secured within the outer mounting spacer structure 18 in a rattle free condition.

As best shown in FIG. 4, a plurality of parallel elongated fasteners, generally indicated at 26, are provided as part of the vehicle component mounting assembly 10. Each bolt 26 includes a shank 28 having a threaded vehicle component engaging end 30 and a head 32 at the opposite end. The bolts 26 are used to secure the vehicle component 14 to the mounting spacer assembly 16 welded to the frame member 12.

When assembled as shown in FIG. 4, the outer and inner mounting spacer structures 18 and 20 include a plurality of longitudinally extending structure portions, generally indicated at 34, which are disposed (1) in generally surrounding relation with the fastener shanks 28 and (2) in force transmitting relation between the vehicle component 14 and each of the fastener heads 32.

Referring back to FIG. 1, the vehicle engine cradle assembly 11 is formed of a pair of transversely spaced longitudinally extending frame members 36 which are interconnected at one of their ends by a cross frame member 38 and at their other ends by the frame member 12. Each frame member is preferably constructed using a hydroform technique defined by an irregularly outwardly deformed tubular metallic wall fixed into a predetermined irregular exterior surface configuration although in its broadest aspects the invention contemplates the frame member 12 may be of any suitable construction. The mounting spacer assembly 16 extends through the openings 22 in the spaced tubular wall portions of the vehicle frame member 12 and the outer spacer structure 18 is peripherally welded as indicated at 24 to the exterior of each wall portion. The preferred form of the vehicle engine cradle assembly 11 is disclosed in Beckman et al., U.S. Pat. No. 5,882,039.

The vehicle component 14 mounted to the mounting spacer assembly 16 embodied in the present invention is preferably a torque isolator component which serves to isolate engine torque and vibration from the vehicle engine cradle assembly 11 during the vehicle operation. Torque isolators are generally well known in the automotive parts art and generally include a metal portion substantially surrounded by a rubber portion, which is surrounded by a metal structure having threaded fastener receiving openings.

The outer mounting spacer structure 18 of the mounting spacer assembly 16 is best illustrated in FIG. 4 as being formed from a sheet metal blank bent to provide a central connecting portion 44 which has each end thereof integrally interconnected with an intermediate arcuate force transmitting portion 46. Each intermediate arcuate force transmitting portion 46 is integrally connected to an intermediate connecting portion 48 each of which, in turn, is integrally connected with an arcuate free end force transmitting portion 50. The arcuate free end force transmitting portion 50 are formed by the ends of the sheet metal blank and are displaced adjacent to one another with end edges 52 opposing one another.

Figure 2:
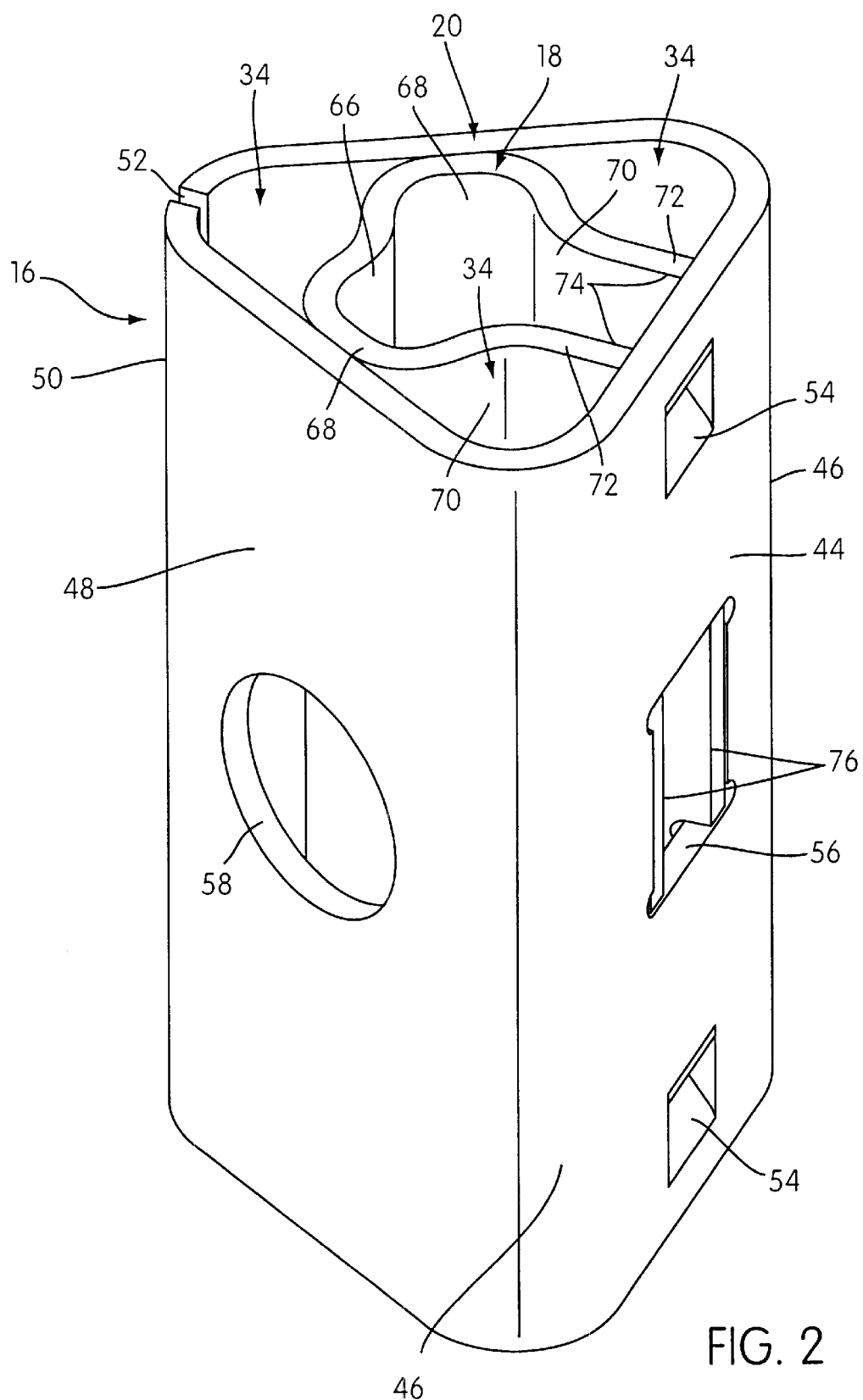
FIG. 2 is a perspective view looking down from the top of one side of a mounting spacer assembly which includes a vehicle component mounting assembly embodying the principles of the present invention included in the vehicle component mounting assembly shown in FIG. 1.
Figure 5:
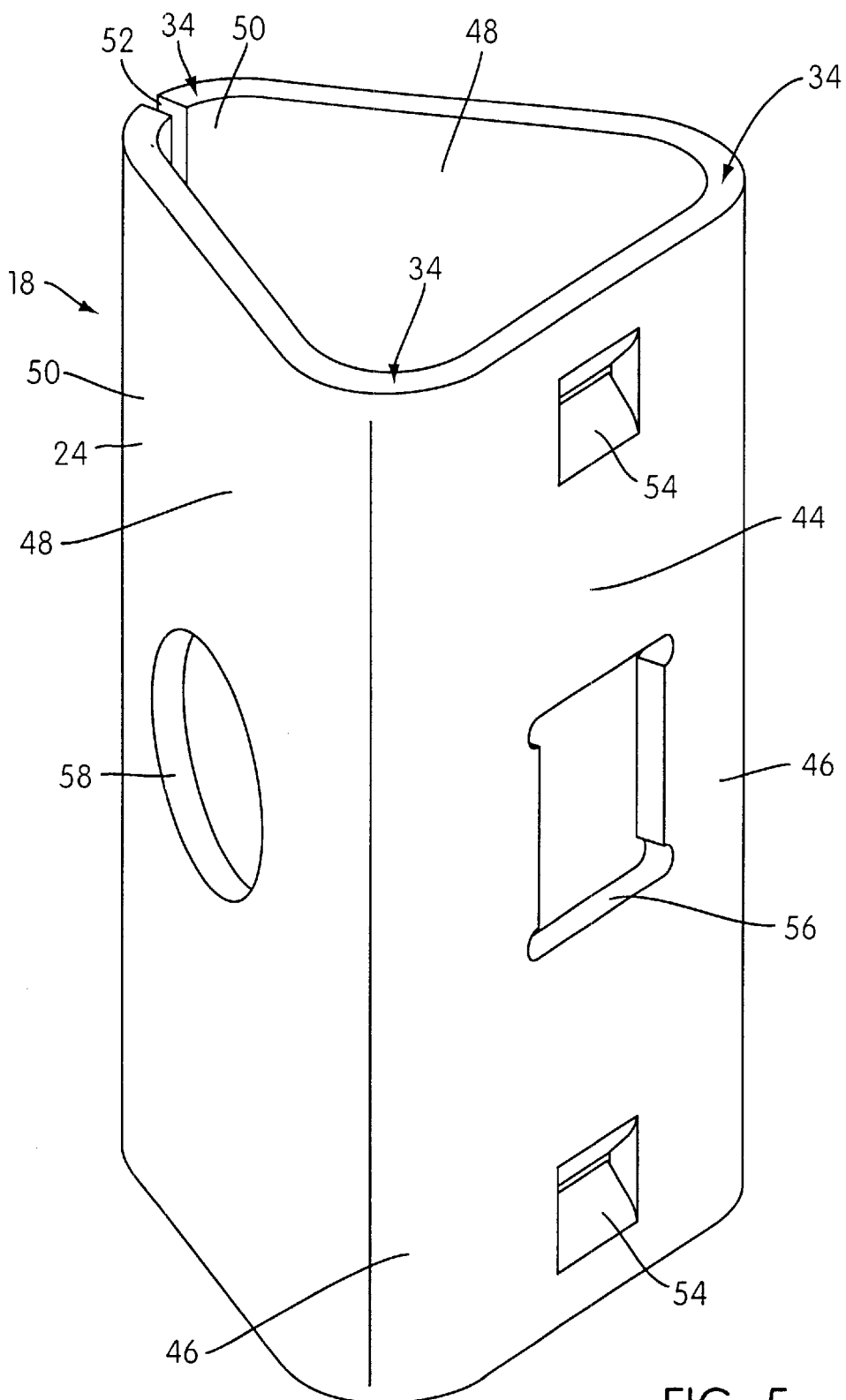
FIG. 5 is a perspective view looking down from the top of one side of the outer mounting spacer structure of the mounting spacer assembly shown in FIG. 2.

As best shown in FIGS. 2 and 5, the central connecting portion 44 has longitudinally spaced pairs of lance protrusions 54, with each pair of lance protrusions being disposed in edge opposing relation with respect to one another. A tab receiving opening 56 is centrally formed in the central connecting portion 44 in spaced relation between the pair of lance protrusions 54. An opening 58 is die-stamped from each intermediate connecting portion 50 of the outer sheet metal blank.

FIG. 5 shows the best illustration of the inner mounting spacer structure 20 of the mounting spacer assembly 16 as being formed from a sheet metal blank bent to provide a central force transmitting portion 66 having each end thereof integrally interconnected with an intermediate connecting portion 68. Each intermediate arcuate connecting portion 68 is integrally connected to an intermediate arcuate force transmitting portion 70 each of which, in turn, is integrally connected to an end connecting portion 72. The end connecting portions 72 are formed by the ends of the sheet metal blank and are displaced adjacent to one another with end walls 74 opposing one another.

Each of the end connecting portions 72 of the inner sheet metal blank has a central projection tab 76, which is configured and positioned to enter the tab receiving opening 56 on the outer sheet metal blank when the inner sheet metal blank is secured within the outer sheet metal blank.

Assembly

While the outer mounting spacer structure 18 and the inner mounting spacer structure 20 may be of any suitable construction, the preferred construction shown in the drawings is in the form of blanks made from strong, rigid metallic material as, for example, steel. An outer blank is stamped in a progressive die-stamping procedure to provide the outer mounting spacer structure 18 which forms a sheet metal member having the force transmitting portions 46 and 50 and the connecting portions 44 and 48, however, the free end portions 50 are disposed in an openly spaced relationship with the edges 52 spaced more widely apart. In addition, during the progressive die-stamping procedure, openings 56 and 58 are punched and lanced protrusions 54 are lanced.

Figure 6:
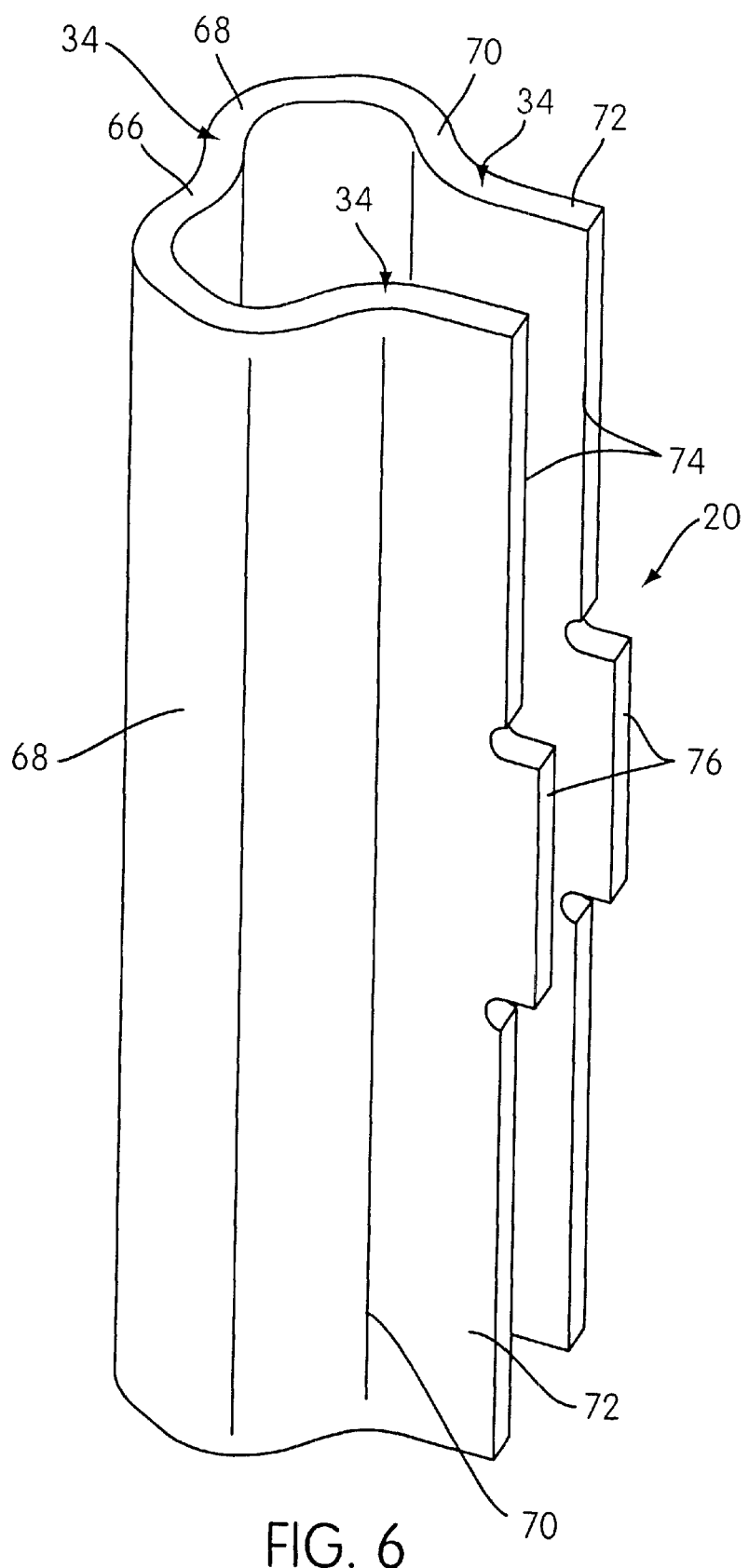
FIG. 6 is a perspective view looking down from the top of one side of the inner mounting spacer structure of the mounting spacer assembly shown in FIG. 2.

An inner blank is stamped in a progressive die-stamping procedure to provide the inner mounting spacer structure 20 which forms a sheet metal member having the force transmitting portions 66 and 70 and the connecting portions 68 and 72 as previously described and shown in the embodiment in FIG. 6.

The central connecting portion 44 of the outer sheet metal blank is lanced to form a protrusion 54 prior to and during the positioning procedure. The lancing procedure positions the lanced protrusion 54 between the parallel end connecting portions 72 in such a way as to prevent the end walls 74 from moving toward one another. Openings 58 are punched in the pair of connecting portions 50 on opposite sides of the central connection portion 44 of the outer sheet metal blank prior to and during the positioning procedure so that the pair of connecting portions 50 will stamp similarly to the central connecting portion 44 during the connecting procedure.

The tab receiving opening 56 is punched into the central connecting portion 44 of the outer sheet metal blank prior to and during the positioning procedure.

The inner sheet metal blank is stamped to include a pair of end connecting portions 72 having the tabs 76 thereon prior to and during the positioning procedure.

The inner sheet metal blank is positioned within the outer sheet metal blank when the free end portions 52 are in the openly spaced relation. The projecting tab 76 on the inner sheet metal blank is positioned within the tab receiving opening 56 on the outer sheet metal blank with some assembly clearances.

The outer and inner sheet metal blanks including the free end portions 52 are stamped toward one another into an operative secured position in a rattle free condition wherein the arcuate force transmitting portions 46, 50,66 and 70 and the connecting portions 44, 48, 68 and 72 cooperate together to form a plurality of longitudinally extending structural portions 34 configured to substantially surround the plurality of fastener shanks 28.

After the stamping of the end connecting portions 72, and as part of the final stamping procedure, the end surfaces 78 of the outer and inner sheet metal blanks are coined longitudinally toward one another to effect stamped interengagement of the sheet metal defining the tab receiving opening 56 with the projecting tab 76.

One of the advantages of the present invention resides in the fact that the upper end and lower end of the assembly 16 each comprise substantially co-planer edges of the inner and outer components, that the planar opposite ends of the assembly 16 are parallel to one another within about +/−0.25 mm, and that this can be achieved without the need to machine the assembly 16. Rather, the coined components have opposite upper and lower edges that meet the tolerance requirements without the need for expensive machining operations. As shown in FIG. 2., the upper edge 72 of the inner member is substantially coplanar with the upper edge of the outer member 18. The same construction exists on the opposite end of the part 16 (not shown).

A single welding process accomplishes the mounting of the mounting spacer assembly 16 onto the vehicle frame 12. The mounting spacer assembly 16 extends through an opening cut from the frame member 12 and an exterior periphery of the outer mounting spacer structure 18 is welded, as indicated at 24, around the peripheral edges of the vehicle frame member 12.

Once welded onto the frame member 12, a vehicle component in the form of the torque isolator component 14 can be mounted onto the mounting spacer assembly 16 by the plurality of elongated fasteners 26. The fasteners 26 are arranged to longitudinally extend through the plurality of longitudinally extending structural portions 34 in order to facilitate engagement between the torque isolator component 14 and the vehicle component engagement end 30 of the fastener shanks 28.

Any U.S. patents or patent applications mentioned or cited herein above are hereby incorporated by reference into the present application.

It will thus be seen that the objects of this invention have been fully and effectively accomplished. It will be realized, however, that the forgoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A vehicle component mounting assembly comprising:
a vehicle frame member;
a vehicle component constructed and arranged to be mounted in supported relation on said vehicle frame member;
a mounting spacer assembly including:
(1) an outer mounting spacer structure extending through an opening in said vehicle frame member and having a central exterior peripheral portion welded to said frame member and
(2) an inner mounting spacer structure secured within said outer mounting spacer structure in a rattle free condition;
a plurality of parallel elongated fasteners each having a shank configured at one end to engage said vehicle component and having a head at the opposite end;
said mounting spacer assembly including a plurality of longitudinally extending structural portions disposed
(1) in generally surrounding relation with each of said fastener shanks and (2) in force transmitting relation between said vehicle component and each of said heads.

2. An assembly as defined in claim 1, wherein said vehicle frame member is constructed and arranged as part of a vehicle cradle assembly.

3. An assembly as defined in claim 2, wherein said vehicle frame member is defined by an irregularly outwardly deformed tubular metallic wall fixed into a predetermined irregular exterior surface configuration.

4. An assembly as defined in claim 3, wherein said vehicle component mounting assembly comprises a torque isolator constructed and arranged to be connected in torque and vibration isolating relation to a vehicle engine.

5. An assembly as defined in claim 1, wherein said outer mounting spacer structure comprises an outer sheet metal member including a plurality of arcuate longitudinally extending force transmitting portions integrally interconnected in annularly spaced relation by a plurality of straight longitudinally extending connecting portions,
said inner mounting spacer structure comprises an inner sheet metal member including a plurality of arcuate longitudinally extending force transmitting portions integrally interconnected in annularly spaced relation by a plurality of straight longitudinally extending connecting portions,
said connecting portions of said inner and outer members are interengaged to secure said inner sheet metal member within said outer sheet metal member in rattle free condition,
said arcuate portions of said inner and outer members cooperating together to provide said plurality of longitudinally extending structural portions.

6. A mounting spacer assembly comprising
an outer mounting spacer member of sheet metal including a plurality of arcuate longitudinally extending force transmitting portions integrally interconnected in annularly spaced relation by a plurality of longitudinally extending connecting portions, an inner mounting spacer member of sheet metal including a plurality of arcuate longitudinally extending force transmitting portions integrally interconnected in annularly spaced relation by a plurality of longitudinally extending connecting portions, said inner mounting spacer member being mounted within said outer mounting spacer member in rattle free condition in a position so that said arcuate force transmitting portions cooperate together to generally surround a plurality of annularly spaced fasteners when extended between end surfaces of said members.

7. An assembly as defined in claim 6, wherein a central connecting portion of said outer sheet metal member includes an opening therein and said inner sheet metal member includes a projection tab on an end connecting portion thereof configured and positioned to enter the opening when said inner member is secured within said outer member.

8. An assembly as defined in claim 7, wherein said inner and outer members are coined to effect stamped interengagement of the sheet metal defining the opening with said tab.

9. An assembly as defined in claim 8, wherein said inner sheet metal member includes another end connecting portion disposed in parallel relation with said first mentioned end connecting portion having another projection tab thereon configured and positioned to enter the opening on said outer member in spaced relation with said first mentioned projecting tab, said projecting tabs on said parallel end connecting portions being disposed in engaged relation to opposite edges defining said opening to prevent movement of said parallel end connecting portions away from one another.

10. An assembly as defined in claim 9, wherein said outer sheet metal member has a lance protrusion extending between said spaced end connecting portions to prevent movement thereof toward one another.

11. An assembly as defined in claim 10, wherein said outer sheet metal member includes a second lance protrusion, said lance protrusions being spaced longitudinally on opposite sides of said opening.

12. An assembly as defined in claim 11, wherein said outer sheet metal member includes a pair of connecting portions on opposite sides of said central connecting portion, said pair of connecting portions having openings therein allowing said pair of connecting portions to stamp similarly to said central connecting portions when said inner and outer members are coined.

13. A mounting spacer according to claim 6, wherein said outer mounting spacer member has upper and lower opposite edges, wherein said inner mounting spacer member has upper and lower opposite edges, wherein said upper edges of said outer mounting spacer member and said inner mounting spacer member cooperate to form an upper end of said part, wherein said lower edges of said outer mounting spacer member and said inner mounting spacer member cooperate to form a lower end of said part, and wherein the upper and lower ends of said part are parallel to one another within +/−0.25 mm.

* * * * *